US012757160B2

(12) United States Patent
Wang et al.

(10) Patent No.: US 12,757,160 B2
(45) Date of Patent: Oct. 6, 2026

(54) POSITIONING METHOD AND APPARATUS, COMMUNICATION DEVICE, AND NETWORK-SIDE DEVICE

(71) Applicant: VIVO MOBILE COMMUNICATION CO., LTD., Guangdong (CN)

(72) Inventors: Yuanyuan Wang, Guangdong (CN); Huaming Wu, Guangdong (CN); Ye Si, Guangdong (CN); Zixun Zhuang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 403 days.

(21) Appl. No.: 18/468,306

(22) Filed: Sep. 15, 2023

(65) Prior Publication Data

US 2024/0007995 A1 Jan. 4, 2024

Related U.S. Application Data

(63) Continuation of application No. PCT/CN2022/081193, filed on Mar. 16, 2022.

(30) Foreign Application Priority Data

Mar. 17, 2021 (CN) ......................... 202110286968.5

(51) Int. Cl.
*H04W 64/00* (2009.01)
*H04L 5/00* (2006.01)

(52) U.S. Cl.
CPC ......... *H04W 64/006* (2013.01); *H04L 5/0051* (2013.01)

(58) Field of Classification Search
None
See application file for complete search history.

(56) References Cited

U.S. PATENT DOCUMENTS

2017/0243529 A1 8/2017 Hung et al.
2019/0230475 A1 7/2019 Edge et al.
(Continued)

FOREIGN PATENT DOCUMENTS

CN 105788504 A 7/2016
CN 109451578 A 3/2019
(Continued)

OTHER PUBLICATIONS

Third Chinese Office Action for Chinese Patent Application No. 202110286968.5 mailed Oct. 28, 2025. 29 pages.
(Continued)

*Primary Examiner* — Frantz Bataille
(74) *Attorney, Agent, or Firm* — BROOKS KUSHMAN P.C.

(57) ABSTRACT

A positioning method and apparatus, a communication device, and a network-side device are provided. The method includes: performing measurement on and/or sending a reference signal; and determining first information based on the reference signal; where the first communication device has at least one of the following characteristics: real location information of the first communication device being already known; location track of the first communication device being already known; first location information quality of the first communication device being higher than a first threshold; first location error of the first communication device being less than a second threshold; movement of the first communication device being controlled or configured by a network side; a first location of the first communication device being controlled or configured by the network side.

20 Claims, 10 Drawing Sheets

(56) References Cited

U.S. PATENT DOCUMENTS

| | | | | |
|---|---|---|---|---|
| 2020/0099490 | A1* | 3/2020 | Sridharan | H04L 5/0007 |
| 2020/0145977 | A1 | 5/2020 | Kumar et al. | |
| 2020/0212990 | A1 | 7/2020 | Kurras et al. | |
| 2022/0043099 | A1 | 2/2022 | Da et al. | |
| 2022/0338203 | A1* | 10/2022 | Cha | H04L 5/0048 |

FOREIGN PATENT DOCUMENTS

| | | | |
|---|---|---|---|
| CN | 111279208 | A | 6/2020 |
| CN | 111343579 | A | 6/2020 |
| JP | 2013200197 | A | 10/2013 |
| WO | 2019156620 | A1 | 8/2019 |
| WO | 2020193853 | A1 | 10/2020 |
| WO | 2021029683 | A1 | 2/2021 |

OTHER PUBLICATIONS

International Search Report and Written Opinion for Application No. PCT/CN2022/081193, dated May 16, 2022 7 Pages.

Huawei "Discussion on IDLE/INACTIVE state positioning, on-demand PRS, and latency analysis" 3GPP TSG-RAN WG2 Meeting #112 electronic, Online, Nov. 2020, R2-2010276, 15 Pages.

Intel Corporation "Text proposal for TR38.857 on latency reduction results" 3GPP TSG-RAN WG2 Meeting #113-e, Electronic Meeting, Jan. 2021, R2-2102094, 25 Pages.

Extended European Search Report for Application No. 22770556.3, dated Aug. 30, 2024, 13 Pages.

Ericsson "Potential positioning enhancements" 3GPP TSG-RAN WG1 Meeting #103-e, e-Meeting, Oct. 2020, R1-2008765, 35 Pages.

Qualcomm Incorporated "Enhancements on Timing Error Mitigations for improved Accuracy" 3GPP TSG RAN WG1 #104-e, e-Meeting, Jan. 2021, R1-2101468, 12 Pages.

Qualcomm Incorporated "Positioning Latency Reduction" 3GPP TSG-RAN WG2 Meeting #113-e, Electronic, Jan. 2021, R2-2101469, 10 Pages.

CATT "Discussion of NR positioning enhancements" 3GPP TSG RAN WG1 Meeting #103-e, e-Meeting, Oct. 2020, R1-2007860, 22 Pages.

First Office Action for Japanese Application No. 2023-557033, dated Jul. 22, 2024, 11 Pages.

3GPP 3rd Generation Partnership Project; Technical Specification Group Radio Access Network; LTE Positioning Protocol (LPP) (Release 16): 3GPP TS 37.355 v16.2.0 (Sep. 2020), 2020, 65 Pages.

Ericsson "Presentation of Specification/Report to TSG: TR 38.857, Version 2.0.0" 3GPP TSG-RAN Meeting #91e, online, Mar. 2020, RP-210530, 541 Pages.

* cited by examiner

POSITIONING METHOD AND APPARATUS, COMMUNICATION DEVICE, AND NETWORK-SIDE DEVICE

CROSS-REFERENCE TO RELATED APPLICATIONS

This application is a continuation of PCT International Application No. PCT/CN2022/081193 filed on Mar. 16, 2022, which claims priority to Chinese Patent Application No. 202110286968.5, filed on Mar. 17, 2021, which are incorporated herein by reference in their entireties.

TECHNICAL FIELD

This application pertains to the field of mobile communication technologies, and specifically relates to a positioning method and apparatus, a communication device, and a network-side device.

BACKGROUND

Positioning devices in mobile communication mainly include terminals (also referred to as user equipment (UE)), base stations, transmission and reception points (TRP), and location management functions (LMF). The positioning methods mainly used include terminal-based (UE-based) positioning, terminal-assisted (UE-assisted) positioning, location management function-based (LMF-based) positioning, and 5G radio access network node assisted (NG-RAN node assisted) positioning.

However, due to synchronization errors, device group delays, angle errors, and the like between network-side devices and terminal devices, existing positioning methods are not accurate enough.

SUMMARY

Embodiments of this application are intended to provide a positioning method and apparatus, a communication device, and a network-side device.

According to a first aspect, a positioning method is provided, performed by a first communication device and including:

performing measurement on and/or sending a reference signal; and determining first information based on the reference signal; where the first communication device has at least one of the following characteristics:

real location information of the first communication device being already known;

location track of the first communication device being already known;

first location information quality of the first communication device being higher than a first threshold;

first location error of the first communication device being less than a second threshold;

movement of the first communication device being controlled or configured by a network side;

a first location of the first communication device being controlled or configured by the network side;

a panel used for performing measurement on or sending the reference signal by the first communication device being specified by a network-side device; and group delay information used for performing measurement on or sending a reference signal by the first communication device being specified by the network-side device.

According to a second aspect, a positioning apparatus is provided, including:

a first measurement module, configured to perform measurement on and/or send a reference signal; and a first execution module, configured to determine first information based on the reference signal; where the positioning apparatus has at least one of the following characteristics:

real location information of the positioning apparatus being already known;

location track of the positioning apparatus being already known;

first location information quality of the positioning apparatus being higher than a first threshold;

first location error of the positioning apparatus being less than a second threshold;

movement of the positioning apparatus being controlled or configured by a network side;

a first location of the positioning apparatus being controlled or configured by the network side;

a panel used for performing measurement on or sending the reference signal by the positioning apparatus being specified by a network-side device; and group delay information used for performing measurement on or sending a reference signal by the positioning apparatus being specified by the network-side device.

According to a third aspect, a positioning method is provided, performed by a network-side device and including:

receiving first information reported by a first communication device or a second communication device, where the first information includes at least one of the following:

panel information;

group delay information;

error information;

beam information;

error compensation information;

first location information;

first signal measurement information;

second signal measurement information;

quality of reported location information being higher than a first threshold; and an error of a reported location being less than a second threshold.

According to a fourth aspect, a positioning apparatus is provided, including:

a second transceiver module, configured to receive first information reported by a first communication device or a second communication device; and a second execution module, configured to perform positioning; where the first information includes at least one of the following:

panel information;

group delay information;

error information;

beam information;

error compensation information;

first location information;

first signal measurement information;

second signal measurement information;

quality of reported location information being higher than a first threshold; and an error of a reported location being less than a second threshold.

According to a fifth aspect, a positioning method is provided, performed by a second communication device and including:

receiving first information sent by a first communication device; or receiving second positioning assistance information sent by a network-side device; where the first information includes at least one of the following:

information about transmission and reception point or base station;

panel information;

group delay information;

error information;

beam information;

error compensation information;

first location information; and first signal measurement information;

second signal measurement information;

quality of reported location information being higher than a first threshold; and an error of a reported location being less than the second threshold; and the second positioning assistance information includes at least one of the following:

panel information of a TRP or communication device;

group delay information of the TRP or communication device;

error information of the TRP or communication device;

beam information of the TRP or communication device;

error compensation information of the TRP or communication device;

first location information of the first communication device;

first signal measurement information of the first communication device; and second signal measurement information of the first communication device.

According to a sixth aspect, a positioning apparatus is provided, including:

a third transceiver module, configured to receive first information sent by a first communication device, or receive second positioning assistance information sent by a network-side device; and a third execution module, configured to perform positioning; where the first information includes at least one of the following:

information about transmission and reception point or base station;

panel information;

group delay information;

error information;

beam information;

error compensation information;

first location information; and first signal measurement information;

second signal measurement information;

quality of reported location information being higher than a first threshold; and an error of a reported location being less than the second threshold; and the second positioning assistance information includes at least one of the following:

panel information of a TRP or communication device;

group delay information of the TRP or communication device;

error information of the TRP or communication device;

beam information of the TRP or communication device;

error compensation information of the TRP or communication device;

first location information of the first communication device;

first signal measurement information of the first communication device; and second signal measurement information of the first communication device.

According to a seventh aspect, a network-side device is provided, where the network-side device includes a processor, a memory, and a program or instructions stored in the memory and capable of running on the processor, and when the program or instructions are executed by the processor, the steps of the method according to the third aspect are implemented.

According to an eighth aspect, a communication device is provided, where the communication device includes a processor, a memory, and a program or instructions stored in the memory and capable of running on the processor, and when the program or instructions are executed by the processor, the steps of the method according to the first aspect are implemented, or the steps of the method according to the fifth aspect are implemented.

According to a ninth aspect, a readable storage medium is provided, where the readable storage medium stores a program or instructions, and when the program or instructions are executed by a processor, the steps of the method according to the first aspect are implemented, or the steps of the method according to the third aspect are implemented, or the steps of the method according to the fifth aspect are implemented.

According to a tenth aspect, a chip is provided, where the chip includes a processor and a communication interface, the communication interface is coupled to the processor, and the processor is configured to run a program or instructions of a network-side device to implement the steps of the method according to the first aspect, implement the steps of the method according to the third aspect, or implement the steps of the method according to the fifth aspect.

In the embodiments of this application, the first communication device performs measurement on and/or sends the reference signal, and determines the first information based on the reference signal.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

It should be noted that techniques described in the embodiments of this application are not limited to a long term evolution (LTE) or LTE-advanced (LTE-A) system, and may also be applied to various wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation ($6^{th}$ Generation, 6G) communication system.

Figure 1:
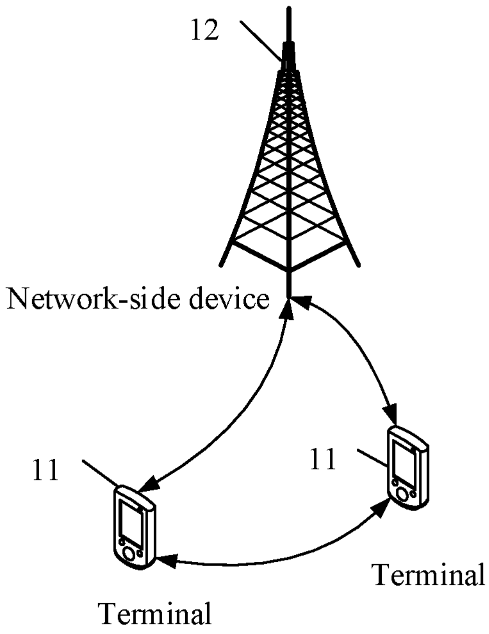
FIG. 1 is a schematic structural diagram of a wireless communication system to which the embodiments of this application are applicable.

FIG. 1 is a schematic structural diagram of a wireless communication system to which the embodiments of this application are applicable. The wireless communication system includes a terminal 11 and a network-side device 12. The terminal 11 may also be referred to as a terminal device or user equipment (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a TRP, or another appropriate term in the art. Provided that a same technical effect is achieved, the base station is not limited to a specific technical term. The base station is not limited to specific technical terms, and the core network device may be a location management device, for example, a location management function (LMF or E-SLMC). It should be noted that in the embodiments of this application, the base station or core network device in the NR system is merely used as an example, and a specific type of the base station or core network device is not limited.

The following describes in detail positioning provided in the embodiments of this application by using specific embodiments and application scenarios thereof with reference to the accompanying drawings.

Figure 2:
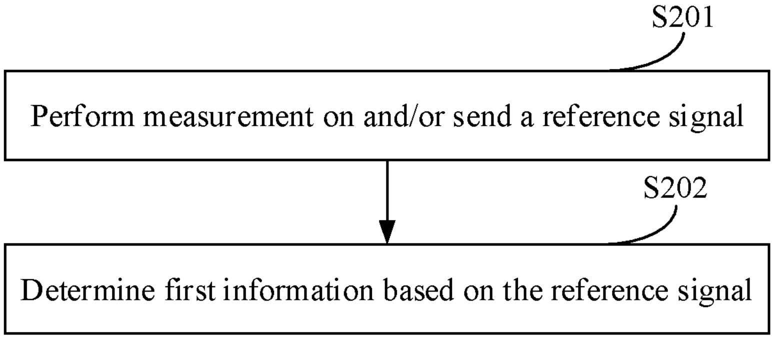
FIG. 2 is a schematic flowchart of a positioning method according to an embodiment of this application.

FIG. 2 is another schematic flowchart of a positioning method according to an embodiment of this application. This method may be performed by a first communication device, in other words, the method may be performed by software or hardware installed in the communication device. As shown in FIG. 2, the method may include the following steps.

Step S201: Perform measurement on and/or send a reference signal.

Step S202: Determine first information based on the reference signal.

The first communication device has at least one of the following characteristics:

- real location information of the first communication device being already known;
- location track of the first communication device being already known;
- first location information quality of the first communication device being higher than a first threshold;
- first location error of the first communication device being less than a second threshold;
- movement of the first communication device being controlled or configured by a network side; where the movement may include one or more of whether to move, speed, direction, rotation direction, and track;
- a first location of the first communication device being controlled or configured by the network side;
- a panel used for performing measurement on or sending the reference signal by the first communication device being specified by a network-side device; and group delay information used for performing measurement on or sending a reference signal by the first communication device being specified by the network-side device.

Further, the first information includes at least one of the following:

information about transmission and reception point or base station;

panel information;

group delay information;

beam information; where the beam information may include: beam identification information, beam angle information, multi-beam measured energy information, and beam error information;

error compensation information;

synchronization information, error information;

first location information; and first signal measurement information.

In an embodiment, the first information includes: information about transmission and reception point or base station; and group delay information, and indicates group delay information corresponding to the transmission and reception point. It should be noted that the group delay may be a transmit group delay or a receive group delay. The group delay information may be used to indicate a group delay between different links within the transmission and reception point, or may indicate a group delay between different transmission and reception points.

In another embodiment, the first information includes: beam information and error information. The information indicates a corresponding beam, such as a transmit beam, a receive beam, or an error corresponding to each antenna element, for example, an angle error of the transmit beam, or a shape error of the transmit beam, or a location error and spacing error of the antenna element.

It should be noted that the present invention includes any combination of the above, which is not exemplified herein.

Further, the real location information is obtained according to a radio access technology (RAT-independent) positioning technology or an angle-based positioning technology. The RAT-independent includes global navigation satellite system (GNSS) positioning, sensor positioning, and the like. The angle-based positioning technology includes an angle of arrival (AoA) positioning technology or an angle of departure (AoD) positioning technology.

Further, the first location information includes at least one of the following:

absolute location information;

relative location information;

track information;

path information;

speed information;

acceleration information; and direction information.

Further, the method for obtaining the first location information includes at least one of the following:

hybrid positioning method;

angle positioning method;

time positioning method; and

RAT-independent positioning method.

Therefore, in the positioning method provided in this embodiment of this application, the first communication device performs measurement on and/or sends the reference signal, and determines the first information based on the reference signal, thereby improving positioning accuracy of the communication device.

Figure 3:
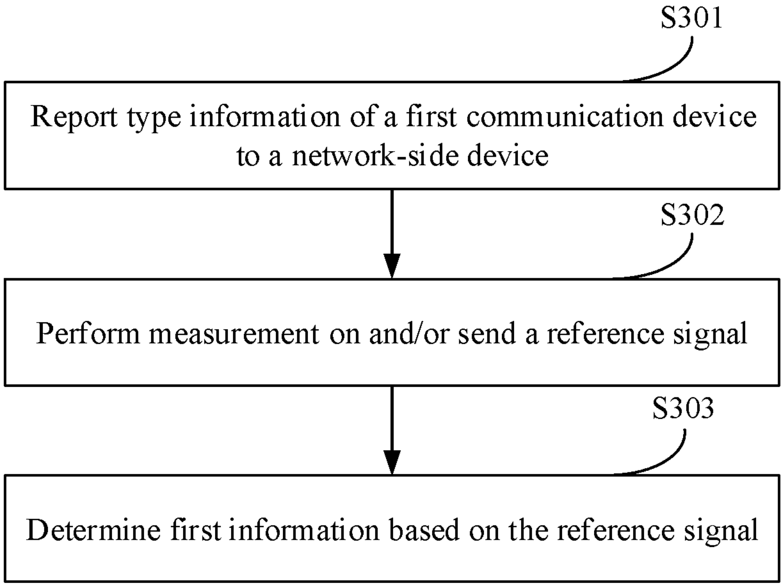
FIG. 3 is another schematic flowchart of a positioning method according to an embodiment of this application.

FIG. 3 shows a schematic flowchart of a positioning method according to an embodiment of this application. As shown in FIG. 3, the method includes the following steps:

Step S301: Report type information of a first communication device to a network-side device.

Figure 4:
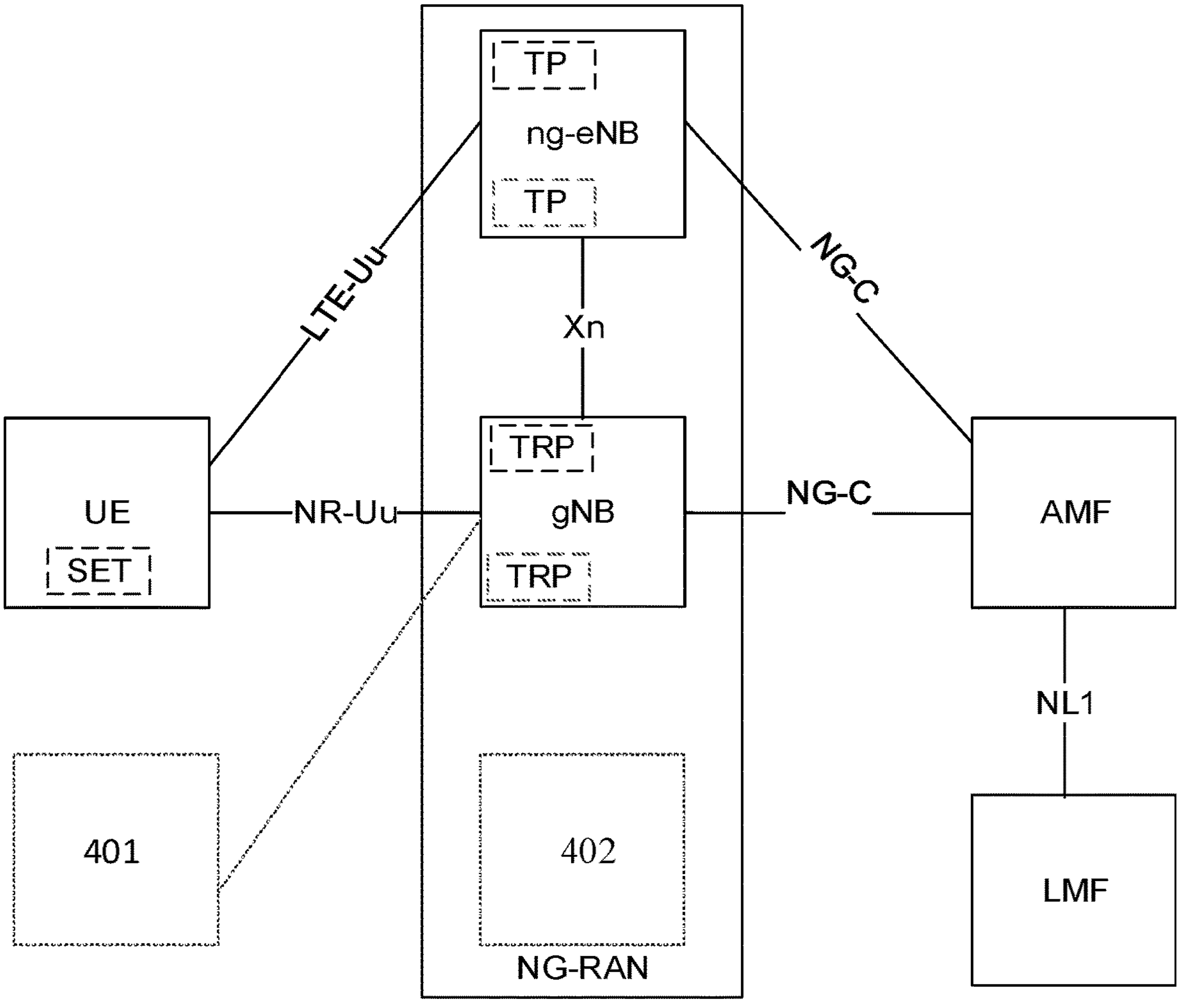
FIG. 4 is a schematic diagram of a network architecture of a positioning method according to an embodiment of this application.

Further, as shown in FIG. 4, the first communication device includes at least one of the following types:

terminal type, as shown in 401 of FIG. 4, for example, a reference terminal or a non-reference terminal;

terminal-type roadside unit (RSU) or transmission and reception point, for example, a terminal-type RSU or TRP with known location or receive beam direction information or a terminal-type RSU or TRP with unknown location or receive beam direction information;

base station type, as shown in 402 of FIG. 4; and base station-type roadside unit or transmission and reception point, for example, base station-type RSU or TRP with known location or receive beam direction information, or base station-type RSU or TRP with unknown location or receive beam direction information;

Further, type information of the first communication device includes at least one of the following:

the first communication device being a reference communication device, where the reference communication device is a communication device that is specified by the network-side device or that satisfies a first condition; and the first communication device being a non-reference communication device.

For being specified by the network-side device, a reference communication device needs to be specified based on a stored positioning result, capability information reported by the UE, location information, and the like. The first condition may be prescribed by a protocol or configured by the network side.

Further, type information of the first communication device further includes at least one of the following:

a location of the first communication device remaining unchanged;

a location of the first communication device remaining unchanged within a first time range; that is, the location of the first communication device remains unchanged within a specific time;

a location track of the first communication device remaining unchanged;

a location track of the first communication device remaining unchanged within a second time range; that is, the location track of the first communication device remains unchanged within a specific time;

a target positioning method supported by the first communication device;

target location request information that the first communication device supports to receive; and target location information that the first communication device supports to report.

Further, the target positioning method supported by the first communication device includes at least one of the following:

hybrid positioning method;

angle positioning method;

time positioning method; and

RAT-independent positioning method.

Further, the target location request information that the first communication device supports to receive includes at least one of the following:

event-triggered location request information;

request information for requesting both location information and signal measurement information;

location request information with quality being higher than a third threshold;

error request information;

group delay request information;

error compensation request information; and panel configuration request information.

The target location request information supported to receive may alternatively be supporting one or more of error request information, group delay request information, and error compensation request information.

Further, the target location information that the first communication device supports to report includes at least one of the following:

panel information;

group delay information, where the group delay information includes group delay identification information, for example, the group delay information is the group delay identification information being the same when a group delay difference of the two transmitted or measured reference signals is less than a threshold 4;

location information and signal measurement information that are simultaneously reported;

quality of reported location information being higher than the first threshold;

an error of a reported location being less than the second threshold;

error information;

error compensation information; and panel configuration information.

The target location information supported to report may alternatively be supporting one or more of error information, group delay information, and error compensation information.

Step S302: Perform measurement on and/or send a reference signal.

Step S303: Determine first information based on the reference signal.

The steps S302 and S303 can implement the method embodiment of the steps S201 and S202 in FIG. 2, with the same technical effects achieved, and the repeated parts are not repeated herein.

Therefore, in the positioning method provided in this embodiment of this application, the type information of the first communication device is transmitted to the network-side device, thereby improving positioning accuracy of the communication device.

Figure 5:
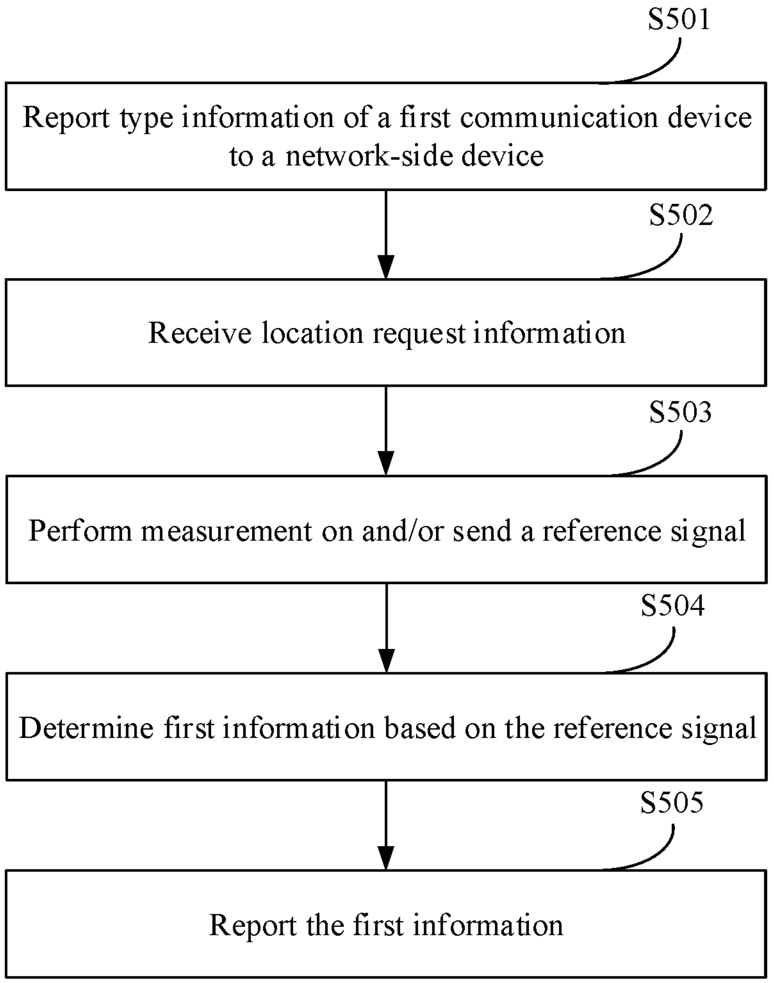
FIG. 5 is another schematic flowchart of a positioning method according to an embodiment of this application.

FIG. 5 shows another schematic flowchart of a positioning method according to an embodiment of this application. As shown in FIG. 5, the method may include the following steps:

Step S501: Report type information of a first communication device to a network-side device.

The step S501 can implement the method embodiment of the step S301 in FIG. 3, with the same technical effects achieved, and the repeated parts are not repeated herein.

Step S502: Receive location request information, where the location request information includes at least one of the following:

type information request for the first communication device;

event trigger condition, for example, a time error group (TEG) configuration changes, quality threshold or error threshold for location information;

error request information;

group delay request information;

error compensation request information;

panel information for performing measurement on and/or sending the reference signal;

group delay group information for performing measurement on and/or sending the reference signal, for example, group identification information or group quantity information;

TRP information specified for measurement; and measurement information specified for reporting.

The location request information may include one or more of the above information, for example, may include one or more of error request information, group delay request information, and error compensation information.

Step S503: Perform measurement on and/or send a reference signal.

Step S504: Determine first information based on the reference signal.

The steps S503 and S504 can implement the method embodiment of the steps S201 and S202 in FIG. 2, with the same technical effects achieved, and the repeated parts are not repeated herein.

Step S505: Report the first information, where the first information includes at least one of the following:

information about transmission and reception point or base station;

panel information;

group delay information;

error information;

beam information;

error compensation information;

first location information;

first signal measurement information;

second signal measurement information;

quality of reported location information being higher than a first threshold; and an error of a reported location being less than a second threshold.

The reported first information may include one or more of the above information, for example, includes one or more of error information, group delay information, and error compensation information.

Further, the error information includes at least one of the following:

reference signal received power (RSRP) measurement error information;

reference signal time difference (RSTD) measurement error information;

receive-transmit time difference (Rx-Tx time difference) measurement error information;

time-of-arrival (TOA) measurement error information;

RSRP information;

angle error information;

transmit beam error information; and receive beam error information.

Further, the group delay information includes at least one of the following:

group delay identification information;

group delay group identification information;

group delay group value information;

group delay group error information;

group delay difference information;

reference group delay identification information; and group delay value information;

It should be understood that the group delay group can be expressed as a TEG, a panel, or the like, including a transmit time error group (Tx TEG), a receive time error group (Rx TEG), and a receive-transmit time error group (RxTx TEG), or {Rx TEG, Tx TEG}. An association relationship may be represented by an associated TEG identifier (TEG ID); or sounding reference signal (SRS) or positioning measurement results of a same TEG are divided into one group, or use other methods. A group delay difference of the same group delay group is less than a threshold, and a delay difference of different group delay groups is greater than the threshold.

Further, the group delay information is at least one of the following:

one or more pieces of group delay information corresponding to at least one TRP;

one or more pieces of group delay difference information corresponding to at least one TRP;

one or more pieces of group delay information corresponding to at least one reference signal or reference signal group; and one or more pieces of group delay difference information corresponding to at least one reference signal or reference signal group.

The group delay information is group delay/group delay difference information of different Tx TEGs corresponding to one or more TRPs, or is group delay/group delay difference information of Tx TEGs of different positioning reference signals or reference signal groups.

In an implementation, in a case of at least three TRPs, the first communication device uses a link with same group delay information to perform measurement for the at least three TRPs, or uses a link with specified group delay information to perform measurement for the at least three TRPs. The three TRPs correspond to a same path, for example, Los or a path at the same location.

In an implementation, if a TEG of the first communication device is determined or negligible, TEG calibration of the TRP may be performed one by one.

Further, before step S503 is performed, the method further includes:

obtaining an association relationship between the group delay information and the reference signal;

obtaining an association relationship between the panel information and the reference signal; and obtaining an association relationship between the beam information and the reference signal.

The first communication device receives an association relationship between the Rx TEG and the reference signal, and/or an association relationship between the Tx TEG of the TRP and the positioning reference signal.

Further, before step S503 is performed, the method further includes:

being indicated to perform measurement on at least one of the following:

target transmission and reception point;

target group delay information; and target reference signal.

The first communication device is indicated to perform measurement on a specific TRP, and/or a Tx TEG of a specific TRP, and/or a specific reference signal.

Further, before step S503 is performed, the method further includes:

specifying a relationship between the first signal measurement information or a receive beam (RxBeam Index) and the group delay information.

In an implementation, the first communication device specifies a positioning measurement result or a relationship between RxBeam Index and Rx TEG, and the positioning measurement result includes a downlink reference signal time difference (DL-RSTD), or Rx-Tx time difference, or other types of measurement results.

Further, before step S503 is performed, the method further includes:

receiving or being indicated an association relationship between the group delay information and the reference signal, for example, an association relationship between the transmit Tx TEG and the positioning reference signal.

Further, the error compensation information includes at least one of the following:

error compensation identification information; and error compensation value information.

The error compensation value information is determined based on the first signal measurement information and location information of the first communication device.

Further, the first signal measurement information includes at least one of the following:

RSRP measurement information;

RSTD measurement error information;

Rx-Tx time difference measurement information;

TOA measurement information;

reference signal identification information;

reference signal received power information;

angle measurement information; and transmission and reception point identification (TRP ID) information.

Further, the second signal measurement information includes at least one of the following:

reference signal received power measurement information;

reference signal time difference measurement information;

receive-transmit time difference measurement information;

time-of-arrival measurement information;

reference signal identification information;

time identification information;

angle measurement information; and transmission and reception point identification information.

Further, the second signal measurement information includes:

time measurement information, angle measurement information, and energy measurement information.

Therefore, in the positioning method provided in this embodiment of this application, the network-side device sends the location request information to the communication device, and the communication device performs measurement on and/or sends a reference signal based on the location request information, and sends the obtained first signal to the network-side device, thereby improving positioning accuracy of the communication device.

Figure 6:
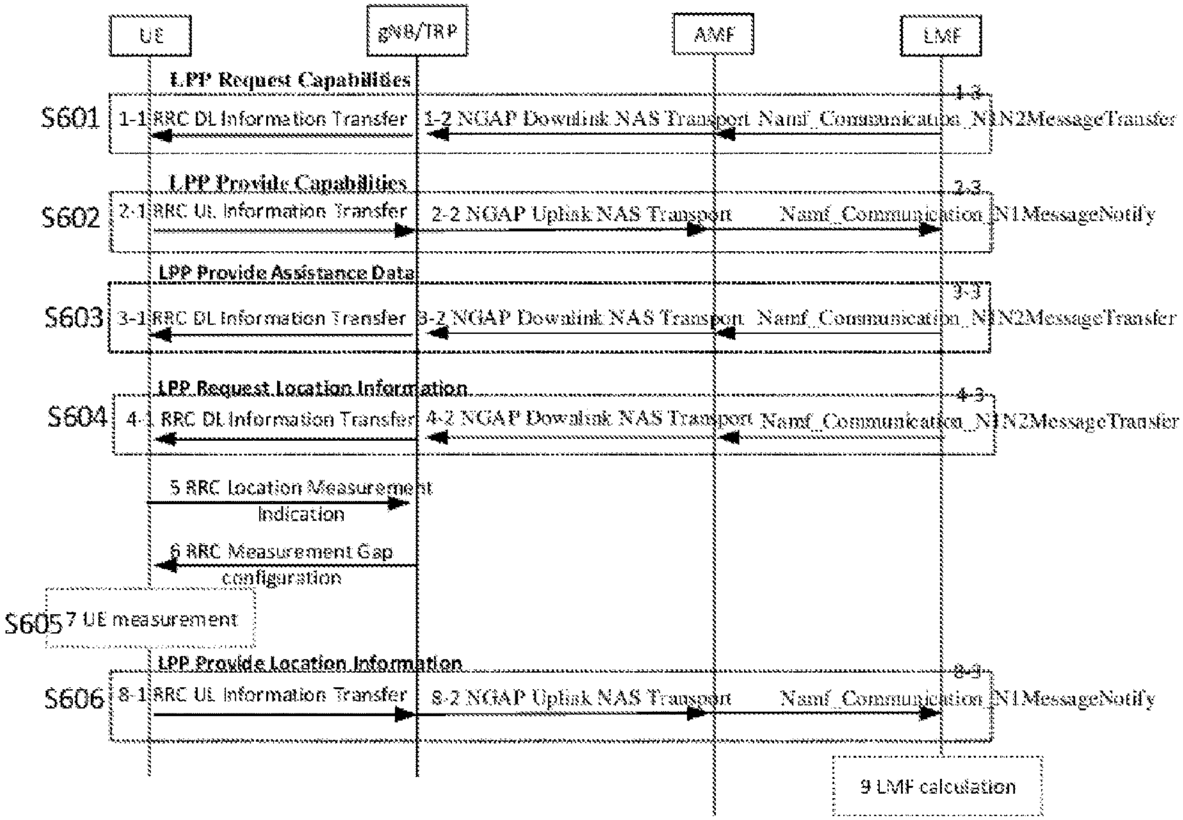
FIG. 6 is another schematic flowchart of a positioning method according to an embodiment of this application.

FIG. 6 shows another schematic flowchart of a positioning method according to an embodiment of this application. As shown in FIG. 6, the method includes the following steps:

Step S601: Receive capability request information sent by a network-side device, where the capability request information is represented by an LPP Request Capabilities message based on the LTE Positioning Protocol (LPP).

The capability request information may be sent by a location management function (LMF) through an access and mobility management function (AMF) and a base station/transmission and reception point (gNB/TRP). The Namf_Communication_N1N2MessageTranfer message and the Namf_Communication_N1N2MessageNotify message are used for interaction between the LMF and the AMF. The AMF and the gNB/TRP implement interaction using the NGAP downlink NAS transport message and the NGAP uplink NAS transport message, and the gNB/TRP and the communication device ULE implement interaction using the RRC downlink information transfer (RRC DL Information Transfer) message and the RRC DL information transfer message. The capability request message may include:

requesting whether the UE supports reporting of both location and measurement result;

requesting whether the UE supports reporting quality of location information;

requesting whether the UE supports measurement or reporting of one of the following information: one or more of error information, group delay information, and error compensation information;

requesting the UE to report UE type or motion status; and requesting whether the UE supports reporting of time-triggered-type location information.

Step S602: Report the type information of the first communication device to the network-side device, where the type information is represented by LPP Provide Capabilities.

The step S602 can implement the method embodiment of the step S301 in FIG. 3, with the same technical effects achieved, and the repeated parts are not repeated herein.

Step S603: Receive positioning assistance data, where the positioning assistance data includes: positioning assistance data used for the first communication device, which is represented by LPP Provide Assistance Data.

Further, the positioning assistance data used for the first communication device includes a target information element corresponding to the first communication device or positioning assistance data obtained through parsing by the first communication device, that is, the target information element contains positioning assistance data that can be parsed out only by the first communication device.

For example, code is shown as follows:

```
NR-DL-TDOA-ProvideAssistanceData-r17::=SE-
  QUENCE {
nr-SelectedDL-PRS-IndexList-r17
NR-SelectedDL-PRS-IndexList-r17
OPTIONAL, --Cond UET
```

Specific positioning assistance information is configured for UET, where the UET is specified UE, specifically a specific UE or UE type, for example, a reference terminal or a first communication device.

Step S604: Receive location request information that is represented by LPP Request Location Information.

Step S605: Perform measurement on and/or send a reference signal that is obtained through terminal calculation (UE Measurement).

Step S606: Determine first information based on the reference signal and report the first information that is represented by LPP Provide Location Information.

The steps S604 to S606 can implement the method embodiment of the steps S502 to S505 in FIG. 5, with the same technical effects achieved, and the repeated parts are not repeated herein.

The location request information includes: a request for the type of the first information and a request for the content of the first information.

Example code of the request for the type of the first information is as follows:

```
LocationInformationType::=ENUMERATED {
locationEstimateRequired,
locationMeasurementsRequired,
locationEstimatePreferred,
locationMeasurementsPreferred,
locationEstimateAndlocationMeasurements
```

where locationEstimateAndlocationMeasurements is used to indicate request for reporting of both location and measurement information.

Example code of the request for the content of the first information is as follows:

```
OPTIONAL, -- Need ON
nr-panelInforRequest-r17
ENUMERATED { requested }
nr-TEGInforRequest-r17
ENUMERATED { requested }
nr-DL-PRS-RstdMeasurement&locationInfoRequest-r17
ENUMERATED { requested }
nr-locationInfoQualityReques-r17
ENUMERATED { requested }
nr-locationStateReques-r17
ENUMERATED { requested }
nr-panelInforConfig-r17
nr-TEGInforConfig-r17
...
}
```

where nr-panelInforRequest-r17, nr-TEGInforRequest-r17, nr-DL-PRS-RstdMeasurement&locationInfoRequest-r17, nr-locationInfoQualityReques-r17, nr-locationStateReques-r17, nr-panelInforConfig-r17, and nr-TEGInforConfig-r17 are respectively used to indicate panel information, group delay group information, request for reporting of both location and measurement information, location information quality, motion status and motion track, panel information, and TEG configuration.

Examples of the first information reported are as follows:

| Information | UE-assisted | UE-based |
|---|---|---|
| Latitude/longitude/altitude, together with uncertainty shape (together with uncertainty shape) | No (Yes) | Yes |
| PCI, GCI, and TRP ID for each measurement | Yes | No |
| Downlink reference signal time difference measurement (DL RSTD measurement) | Yes | No |
| Downlink positioning reference signal and received power measurement (DL-PRS-RSRP measurement) | Yes | No |
| Time stamp of the measurements | Yes | No |
| Time stamp of location estimate | No | Yes |
| Quality for each measurement | Yes | No |
| UE type or location quality | | |

Therefore, in the positioning method provided in this embodiment of this application, the positioning assistance information of the network-side device is received before measurement and/or sending of the reference signal, thereby improving positioning accuracy of the communication device.

It should be noted that the positioning method provided in the embodiments of this application may be performed by a positioning apparatus or a control module for performing the positioning method in the positioning apparatus. In the embodiments of this application, the positioning method being performed by the positioning apparatus is used as an example to describe the positioning apparatus provided in the embodiments of this application.

Figure 7:
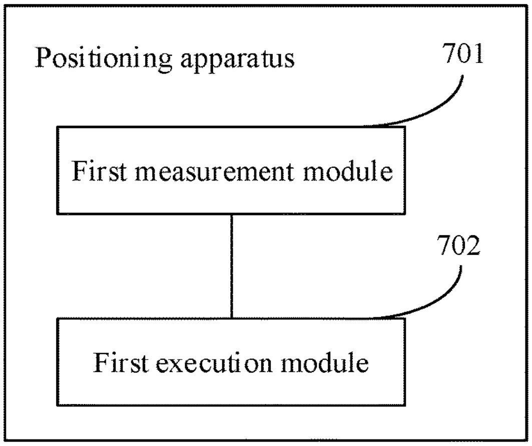
FIG. 7 is a schematic structural diagram of a positioning apparatus according to an embodiment of this application.

FIG. 7 shows a schematic structural diagram of a positioning apparatus according to an embodiment of this application. As shown in FIG. 7, the apparatus includes: a first measurement module 701 and a first execution module 702.

The first measurement module 701 is configured to perform measurement on and/or send a reference signal; and the first execution module 702 is configured to determine first information based on the reference signal.

The positioning apparatus has at least one of the following characteristics:

real location information of the positioning apparatus being already known;

location track of the positioning apparatus being already known;

first location information quality of the positioning apparatus being higher than a first threshold;

first location error of the positioning apparatus being less than a second threshold;

movement of the positioning apparatus being controlled or configured by a network side;

a first location of the positioning apparatus being controlled or configured by the network side;

a panel used for performing measurement on or sending the reference signal by the positioning apparatus being specified by a network-side device; and group delay information used for performing measurement on or sending a reference signal by the positioning apparatus being specified by the network-side device.

Further, the first information includes at least one of the following:

information about transmission and reception point or base station;

panel information;

group delay information;

error information;

beam information;

error compensation information;

first location information; and first signal measurement information;

second signal measurement information;

quality of reported location information being higher than the first threshold; and an error of a reported location being less than the second threshold.

Further, the real location information is obtained according to a RAT-independent positioning technology or an angle-based positioning technology.

Further, the first location information includes at least one of the following:

absolute location information;

relative location information;

track information;

path information;

speed information;

acceleration information; and direction information.

Therefore, in the positioning method provided in this embodiment of this application, the first communication device performs measurement on and/or sends the reference signal, and determines the first information based on the reference signal, thereby improving positioning accuracy of the communication device.

Based on the foregoing embodiment, further, the first communication device includes at least one of the following types:

terminal type;

terminal-type roadside unit or transmission and reception point;

base station type; and base station-type roadside unit or transmission and reception point.

Further, type information of the first communication device includes at least one of the following:

the first communication device being a reference communication device, where the reference communication device is a communication device that is specified by the network-side device or that satisfies a first condition; and the first communication device being a non-reference communication device.

Further, type information of the first communication device further includes at least one of the following:

a location of the first communication device remaining unchanged;

a location of the first communication device remaining unchanged within a first time range;

a location track of the first communication device remaining unchanged;

a location track of the first communication device remaining unchanged within a second time range;

a target positioning method supported by the first communication device;

target location request information that the first communication device supports to receive; and target location information that the first communication device supports to report.

Further, the first execution module is further configured to report the type information of the first communication device to the network-side device.

Further, the supported target positioning method or the method for obtaining the first location information includes at least one of the following:

hybrid positioning method;

angle positioning method;

time positioning method; and

RAT-independent positioning method.

Further, the target location request information supported to receive includes at least one of the following:

event-triggered location request information;

request information for requesting both location information and signal measurement information;

location request information with quality being higher than a third threshold;

error request information;

group delay request information;

error compensation request information; and panel configuration request information.

Further, the target location information supported to report includes at least one of the following:

panel information;

group delay information;

location information and signal measurement information that are simultaneously reported;

quality of reported location information being higher than the first threshold;

an error of a reported location being less than the second threshold;

error information;

error compensation information; and panel configuration information.

Therefore, in the positioning method provided in this embodiment of this application, the type information of the first communication device is transmitted to the network-side device, thereby improving positioning accuracy of the communication device.

Based on the foregoing embodiment, further, the first execution module is further configured to receive location request information, where the location request information includes at least one of the following:

type information request for the first communication device;

event trigger condition;

quality threshold or error threshold for location information;

error request information;

group delay request information;

error compensation request information;

panel information for performing measurement on and/or sending the reference signal;

group delay group information for performing measurement on and/or sending the reference signal;

information about a transmission and reception point specified for measurement; and measurement information specified for reporting.

Further, the first execution module is further configured to receive positioning assistance data, and the positioning assistance data includes:

positioning assistance data used for the first communication device.

Further, the positioning assistance data used for the first communication device includes a target information element corresponding to the first communication device or positioning assistance data obtained through parsing by the first communication device.

Further, after the first information is determined based on the reference signal, the first execution module is further configured to:

report the first information, where the first information includes at least one of the following:

information about transmission and reception point or base station;

panel information;

group delay information;

error information;

beam information;

error compensation information;

first location information; and first signal measurement information;

second signal measurement information;

quality of reported location information being higher than a first threshold; and an error of a reported location being less than a second threshold.

Further, the error information includes at least one of the following:

reference signal received power measurement error information;

reference signal time difference measurement error information;

receive-transmit time difference measurement error information;

time-of-arrival measurement error information;

reference signal received power information;

angle error information;

transmit beam error information; and receive beam error information.

Further, the group delay information includes at least one of the following:

group delay identification information;

group delay group identification information;

group delay group value information;

group delay group error information;

group delay difference information;

reference group delay identification information; and group delay value information;

Further, the group delay information is at least one of the following:

one or more pieces of group delay information corresponding to at least one TRP;

one or more pieces of group delay difference information corresponding to at least one TRP;

one or more pieces of group delay information corresponding to at least one reference signal or reference signal group; and one or more pieces of group delay difference information corresponding to at least one reference signal or reference signal group.

Further, in a case of at least three TRPs, the first communication device uses a link with same group delay information to perform measurement for the at least three TRPs, or uses a link with specified group delay information to perform measurement for the at least three TRPs.

Further, before the performing measurement on and/or sending a reference signal, the first execution module is further configured to perform at least one of the following:

obtaining an association relationship between the group delay information and the reference signal;

obtaining an association relationship between the panel information and the reference signal; and obtaining an association relationship between the beam information and the reference signal.

Further, before the performing measurement on and/or sending a reference signal, the first execution module is further configured:

being indicated to perform measurement on at least one of the following:

target transmission and reception point;

target group delay information; and target reference signal.

Further, before the performing measurement on a reference signal, the first execution module is further configured:

specify a relationship between the first signal measurement information or a receive beam and the group delay information.

Further, before the sending a reference signal, the first execution module is further configured:

receive or be indicated an association relationship between the group delay information and the reference signal.

Further, the error compensation information includes at least one of the following:

error compensation identification information; and error compensation value information.

The error compensation value information is determined based on the first signal measurement information and location information of the first communication device.

Further, the first signal measurement information includes at least one of the following:

reference signal received power measurement information;

reference signal time difference measurement error information;

receive-transmit time difference measurement information;

time-of-arrival measurement information;

reference signal identification information;

reference signal received power information;

angle measurement information; and transmission and reception point identification information.

Further, the second signal measurement information includes at least one of the following:

reference signal received power measurement information;

reference signal time difference measurement information;

receive-transmit time difference measurement information;

time-of-arrival measurement information;

reference signal identification information;

time identification information;

angle measurement information; and transmission and reception point identification information.

Further, the second signal measurement information includes:

time measurement information, angle measurement information, and energy measurement information.

Therefore, in the positioning method provided in this embodiment of this application, the network-side device sends the location request information and the positioning assistance information to the communication device, and the communication device performs measurement on and/or sends a reference signal based on the location request information, and sends the obtained first signal to the network-side device, thereby improving positioning accuracy of the communication device.

The positioning apparatus in this embodiment of this application may be an apparatus, or may be a component, an integrated circuit, or a chip in a communication device. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The positioning apparatus in this embodiment of this application may be an apparatus with an operating system. The operating system may be an Android operating system, an iOS operating system, or other possible operating systems, and is not specifically limited in the embodiments of this application.

The positioning apparatus provided in this embodiment of this application is capable of implementing the processes implemented in the method embodiments in FIG. 2 to FIG. 6, with the same technical effects achieved. To avoid repetition, details are not described herein again.

Figure 8:
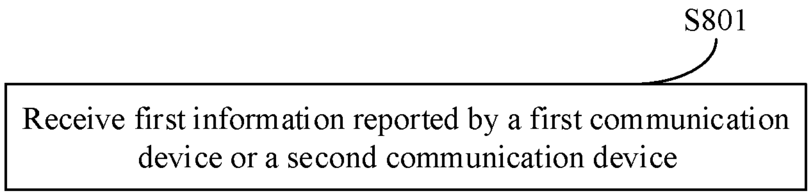
FIG. 8 is another schematic flowchart of a positioning method according to an embodiment of this application.

FIG. 8 is another schematic flowchart of a positioning method according to an embodiment of this application. This method may be performed by a network-side device, in other words, the method may be performed by software or hardware installed in the network-side device. As shown in FIG. 1, the method may include the following step.

Step S801: Receive first information reported by a first communication device or a second communication device, where the first information includes at least one of the following: panel information;

group delay information;

error information;

beam information;

error compensation information;

first location information;

first signal measurement information;

second signal measurement information;

quality of reported location information being higher than a first threshold; and an error of a reported location being less than a second threshold.

Further, the first communication device has at least one of the following characteristics:

real location information of the communication device being already known;

location track of the communication device being already known;

first location information quality of the communication device being higher than the first threshold;

first location error of the communication device being less than the second threshold;

movement of the communication device is controlled or configured by a network side;

a first location of the communication device being controlled or configured by the network side;

a panel used for performing measurement on or sending the reference signal by the communication device being specified by the network-side device; and group delay information used for performing measurement on or sending a reference signal by the communication device being specified by the network-side device.

Further, the first location information includes at least one of the following:

absolute location information;

relative location information;

quality information for location information;

track information;

path information;

speed information;

acceleration information; and direction information.

Therefore, in the positioning method provided in this embodiment of this application, the network-side device obtains the first information reported by the communication device, thereby improving positioning accuracy of the communication device.

Based on the foregoing embodiment, further, the first communication device includes at least one of the following types:

terminal type;

terminal-type roadside unit or transmission and reception point;

base station type; and base station-type roadside unit or transmission and reception point.

Further, type information of the first communication device includes at least one of the following:

the communication device being a reference communication device, where the reference communication device is a communication device that is specified by the network-side device or that satisfies a first condition; and the communication device being a non-reference communication device.

Further, type information of the first communication device further includes at least one of the following:

a location of the communication device remaining unchanged;

a location of the communication device remaining unchanged within a first time range;

a location track of the communication device remaining unchanged;

a location track of the communication device remaining unchanged within a second time range;

a target positioning method supported by the communication device;

target location request information that the communication device supports to receive; and target location information that the communication device supports to report.

Further, before the first information reported by the first communication device or the second communication device is received, the method further includes:

receiving type information reported by the first communication device or the second communication device.

Therefore, in the positioning method provided in this embodiment of this application, the network-side device obtains the type information of the communication device, thereby improving positioning accuracy of the communication device.

Based on the foregoing embodiments, further, before the first information reported by the first communication device or the second communication device is received, the method further includes:

sending location request information to the first communication device or the second communication device, so that the first communication device performs measurement on and/or sends the reference signal, and determines the first information based on the reference signal; where The location request information includes at least one of the following:

type information request for the communication device;

event trigger condition;

quality threshold or error threshold for location information;

error request information;

group delay request information;

error compensation request information;

panel information for performing measurement on and/or sending the reference signal;

group delay group information for performing measurement on and/or sending the reference signal;

information about a transmission and reception point specified for measurement; and measurement information specified for reporting.

Further, the error information includes at least one of the following:

reference signal received power measurement error information;

reference signal time difference measurement error information;

receive-transmit time difference measurement error information;

time-of-arrival measurement error information;

reference signal received power information;

angle error information;

transmit beam error information; and receive beam error information.

Further, the group delay information includes at least one of the following:

group delay identification information;

group delay group identification information;

group delay group value information;

group delay group error information;

group delay difference information;

reference group delay identification information; and group delay value information;

Further, the group delay information is at least one of the following:

one or more pieces of group delay information corresponding to at least one TRP;

one or more pieces of group delay difference information corresponding to at least one TRP;

one or more pieces of group delay information corresponding to at least one reference signal or reference signal group; and one or more pieces of group delay difference information corresponding to at least one reference signal or reference signal group.

Further, before the first information reported by the communication device is received, the method further includes:

sending at least one of the following to the communication device:

an association relationship between the group delay information and the reference signal;

an association relationship between the panel information and the reference signal; and an association relationship between the beam information and the reference signal.

Further, before the first information reported by the communication device is received, the method further includes:

indicating the communication device to perform measurement on at least one of the following:

target transmission and reception point;

target group delay information; and target reference signal.

Further, before the location information reported by the communication device is received, the method further includes:

specifying, to the communication device, a relationship between the first signal measurement information or a receive beam and the group delay information.

Further, before the location information reported by the communication device is received, the method further includes:

sending or indicating an association relationship between the group delay information and the reference signal to the communication device.

Further, the error compensation information includes at least one of the following:

error compensation identification information; and error compensation value information.

The error compensation value information is determined based on the first signal measurement information and location information of the communication device.

Further, the first signal measurement information includes at least one of the following:

reference signal received power measurement information;

reference signal time difference measurement error information;

receive-transmit time difference measurement information;

time-of-arrival measurement information;

reference signal identification information;

reference signal received power information;

angle measurement information; and transmission and reception point identification information.

Further, the second signal measurement information includes at least one of the following:

reference signal received power measurement information;

reference signal time difference measurement information;

receive-transmit time difference measurement information;

time-of-arrival measurement information;

reference signal identification information;

time identification information;

angle measurement information; and transmission and reception point identification information.

Further, the second signal measurement information includes:

time measurement information, angle measurement information, and energy measurement information.

Therefore, in the positioning method provided in this embodiment of this application, the network-side device sends the location request information to the communication device, and the communication device performs measurement on and/or sends a reference signal based on the location request information, and sends the obtained first signal to the network-side device, thereby improving positioning accuracy of the communication device.

Based on the foregoing embodiment, further, before the location request information is sent to the first communication device, the method further includes:

sending positioning assistance data to the first communication device, where the positioning assistance data includes positioning assistance data for the communication device.

Further, after the first information reported by the first communication device is received, the method further includes:

sending second positioning assistance data to the second communication device, where the second positioning assistance includes at least one of the following:

panel information of a TRP, network device, or communication device;

group delay information of a TRP, network device, or communication device;

error information of a TRP, network device, or communication device;

beam information of a TRP, network device, or communication device;

error compensation information of a TRP, network device, or communication device;

first location information of the first communication device;

first signal measurement information of the first communication device; and second signal measurement information of the first communication device.

Further, the second positioning assistance data used for the communication device includes a target information element corresponding to the communication device or positioning assistance data obtained through parsing by the communication device.

Therefore, in the positioning method provided in this embodiment of this application, before the communication device performs measurement on and/or sends the reference signal, the network-side device sends the positioning assistance information to the communication device, thereby improving positioning accuracy of the communication device.

It should be noted that the positioning method provided in the embodiments of this application may be performed by a positioning apparatus or a control module for performing the positioning method in the positioning apparatus. In the embodiments of this application, the positioning method being performed by the positioning apparatus is used as an example to describe the positioning apparatus provided in the embodiments of this application.

Figure 9:
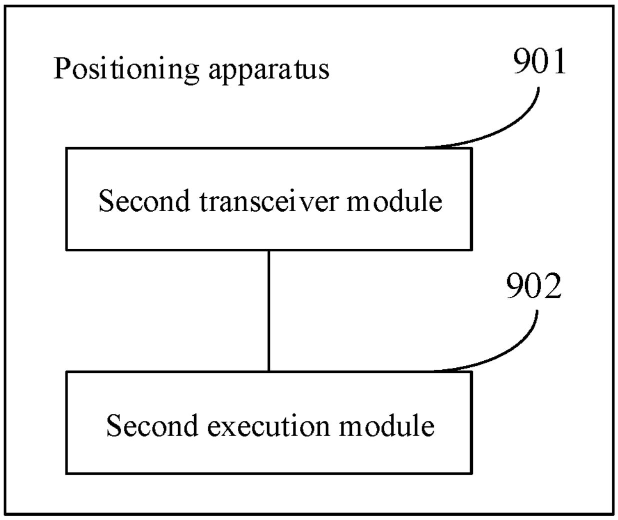
FIG. 9 is another schematic structural diagram of a positioning apparatus according to an embodiment of this application.

FIG. 9 shows another schematic structural diagram of a positioning apparatus according to an embodiment of this application. As shown in FIG. 9, the apparatus includes: a second transceiver module 901 and a second execution module 902.

The second transceiver module 901 is configured to receive first information reported by a first communication device or a second communication device; and the second execution module 902 is configured to perform positioning.

The first information includes at least one of the following:

panel information;

group delay information;

error information;

beam information;

error compensation information;

first location information;

first signal measurement information;

second signal measurement information;

quality of reported location information being higher than a first threshold; and an error of a reported location being less than a second threshold.

Further, the first communication device has at least one of the following characteristics:

real location information of the communication device being already known;

location track of the communication device being already known;

first location information quality of the communication device being higher than the first threshold;

first location error of the communication device being less than the second threshold;

movement of the communication device is controlled or configured by a network side;

a first location of the communication device being controlled or configured by the network side;

a panel used for performing measurement on or sending a reference signal by the communication device being specified by the network-side device; and group delay information used for performing measurement on or sending a reference signal by the communication device being specified by the network-side device.

Further, the first location information includes at least one of the following:

absolute location information;

relative location information;

quality information for location information;

track information;

path information;

speed information;

acceleration information; and direction information.

Therefore, in the positioning method provided in this embodiment of this application, the network-side device obtains the first information reported by the communication device, thereby improving positioning accuracy of the communication device.

Based on the foregoing embodiment, further, the first communication device includes at least one of the following types:

terminal type;

terminal-type roadside unit or transmission and reception point;

base station type; and base station-type roadside unit or transmission and reception point.

Further, type information of the first communication device includes at least one of the following:

the communication device being a reference communication device, where the reference communication device is a communication device that is specified by the network-side device or that satisfies a first condition; and the communication device being a non-reference communication device.

Further, type information of the first communication device further includes at least one of the following:

a location of the communication device remaining unchanged;

a location of the communication device remaining unchanged within a first time range;

a location track of the communication device remaining unchanged;

a location track of the communication device remaining unchanged within a second time range;

a target positioning method supported by the communication device;

target location request information that the communication device supports to receive; and target location information that the communication device supports to report.

Further, the second transceiver module is further configured to receive type information reported by the first communication device or the second communication device.

Therefore, in the positioning method provided in this embodiment of this application, the network-side device obtains the type information of the communication device, thereby improving positioning accuracy of the communication device.

Based on the foregoing embodiment, further, the second transceiver module is further configured to send location request information to the first communication device or the second communication device, so that the first communication device performs measurement on and/or sends the reference signal and determines the first information based on the reference signal.

The location request information includes at least one of the following:

type information request for the communication device;

event trigger condition;

quality threshold or error threshold for location information;

error request information;

group delay request information;

error compensation request information;

panel information for performing measurement on and/or sending the reference signal;

group delay group information for performing measurement on and/or sending the reference signal;

information about a transmission and reception point specified for measurement; and measurement information specified for reporting.

Further, the error information includes at least one of the following:

reference signal received power measurement error information;

reference signal time difference measurement error information;

receive-transmit time difference measurement error information;

time-of-arrival measurement error information;

reference signal received power information;

angle error information;

transmit beam error information; and receive beam error information.

Further, the group delay information includes at least one of the following:

group delay identification information;

group delay group identification information;

group delay group value information;

group delay group error information;

group delay difference information;

reference group delay identification information; and group delay value information.

Further, the group delay information is at least one of the following:

one or more pieces of group delay information corresponding to at least one TRP;

one or more pieces of group delay difference information corresponding to at least one TRP;

one or more pieces of group delay information corresponding to at least one reference signal or reference signal group; and one or more pieces of group delay difference information corresponding to at least one reference signal or reference signal group.

Further, before the first information reported by the communication device is received, the second transceiver module is further configured to send at least one of the following to the communication device:

an association relationship between the group delay information and the reference signal;

an association relationship between the panel information and the reference signal; and an association relationship between the beam information and the reference signal.

Further, before the first information reported by the communication device is received, the second transceiver module is further configured to indicate the communication device to perform measurement on at least one of the following:

target transmission and reception point;

target group delay information; and target reference signal.

Further, before the location information reported by the communication device is received, the second transceiver module is further configured to specify a relationship between the first signal measurement information and the group delay information to the communication device.

Further, before the location information reported by the communication device is received, the second transceiver module is further configured to send or indicate an association relationship between the group delay information and the reference signal to the communication device.

Further, the error compensation information includes at least one of the following:

error compensation identification information; and error compensation value information.

The error compensation value information is determined based on the first signal measurement information and location information of the communication device.

Further, the first signal measurement information includes at least one of the following:

reference signal received power measurement information;

reference signal time difference measurement error information;

receive-transmit time difference measurement information;

time-of-arrival measurement information;

reference signal identification information;

reference signal received power information;

angle measurement information; and transmission and reception point identification information.

Further, the second signal measurement information includes at least one of the following:

reference signal received power measurement information;

reference signal time difference measurement information;

receive-transmit time difference measurement information;

time-of-arrival measurement information;

reference signal identification information;

time identification information;

angle measurement information; and transmission and reception point identification information.

Further, the second signal measurement information includes:

time measurement information, angle measurement information, and energy measurement information.

Therefore, in the positioning method provided in this embodiment of this application, the network-side device sends the location request information to the communication device, and the communication device performs measurement on and/or sends a reference signal based on the location request information, and sends the obtained first signal to the network-side device, thereby improving positioning accuracy of the communication device.

Based on the foregoing embodiment, further, before the location request information is sent to the first communication device, the second transceiver module is further configured to send positioning assistance data to the first communication device, where the positioning assistance data includes: positioning assistance data used for the communication device.

Further, after the first information reported by the first communication device is received, the second transceiver module is further configured to send second positioning assistance data to the second communication device, where the second positioning assistance includes at least one of the following:

panel information of a TRP, network device, or communication device;

group delay information of a TRP, network device, or communication device;

error information of a TRP, network device, or communication device;

beam information of a TRP, network device, or communication device;

error compensation information of a TRP, network device, or communication device;

first location information of the first communication device;

first signal measurement information of the first communication device; and second signal measurement information of the first communication device.

Further, the second positioning assistance data used for the communication device includes a target information element corresponding to the communication device or positioning assistance data obtained through parsing by the communication device.

Therefore, in the positioning method provided in this embodiment of this application, before the communication device performs measurement on and/or sends the reference signal, the network-side device sends the positioning assistance information to the communication device, thereby improving positioning accuracy of the communication device.

The positioning apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The positioning apparatus in this embodiment of this application may be an apparatus with an operating system. The operating system may be an Android operating system, an iOS operating system, or other possible operating systems, and is not specifically limited in the embodiments of this application.

The positioning apparatus provided in this embodiment of this application is capable of implementing the processes implemented in the method embodiments in FIG. 8, with the same technical effects achieved. To avoid repetition, details are not described herein again.

Figure 10:
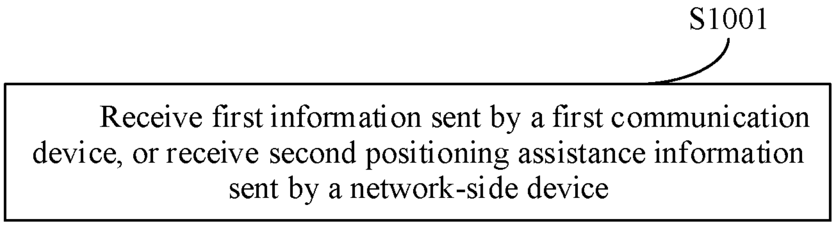
FIG. 10 is another schematic flowchart of a positioning method according to an embodiment of this application.

FIG. 10 is another schematic flowchart of a positioning method according to an embodiment of this application. This method is performed by a second communication device, in other words, the method may be performed by software or hardware installed in the communication device. As shown in FIG. 10, the method may include the following steps:

Step S1001: Receive first information sent by a first communication device; or receive second positioning assistance information sent by a network-side device.

The first information includes at least one of the following:

information about transmission and reception point or base station;

panel information;

group delay information;

error information;

beam information;

error compensation information;

first location information; and first signal measurement information;

second signal measurement information;

quality of reported location information being higher than a first threshold; and an error of a reported location being less than the second threshold.

The second positioning assistance information includes at least one of the following:

panel information of a TRP or communication device;
group delay information of the TRP or communication device;
error information of the TRP or communication device;
beam information of the TRP or communication device;
error compensation information of the TRP or communication device;
first location information of the first communication device;
first signal measurement information of the first communication device; and
second signal measurement information of the first communication device.

Further, the first communication device has at least one of the following characteristics:
real location information of the communication device being already known;
location track of the communication device being already known;
first location information quality of the communication device being higher than the first threshold;
first location error of the communication device being less than the second threshold;
movement of the communication device is controlled or configured by a network side;
a first location of the communication device being controlled or configured by the network side;
a panel used for performing measurement on or sending the reference signal by the communication device being specified by the network-side device; and
group delay information used for performing measurement on or sending a reference signal by the communication device being specified by the network-side device.

Further, the second communication device determines at least one of the following of the second communication device based on the first information and/or the second positioning assistance data:
first location information; and
first signal measurement information.

Therefore, in the positioning method provided in this embodiment of this application, the first information sent by the first communication device or the second positioning assistance information sent by the network-side device is received, thereby improving positioning accuracy of the communication device.

It should be noted that the positioning method provided in the embodiments of this application may be performed by a positioning apparatus or a control module for performing the positioning method in the positioning apparatus. In the embodiments of this application, the positioning method being performed by the positioning apparatus is used as an example to describe the positioning apparatus provided in the embodiments of this application.

Figure 11:
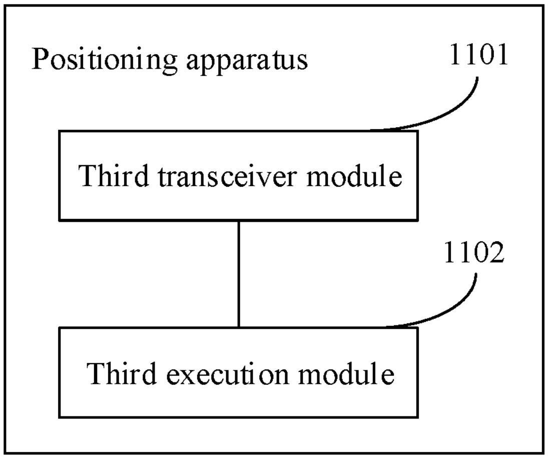
FIG. 11 is another schematic structural diagram of a positioning apparatus according to an embodiment of this application.

FIG. 11 shows another schematic structural diagram of a positioning apparatus according to an embodiment of this application. As shown in FIG. 11, the apparatus includes: a third transceiver module 1101 and a third execution module 1102.

The third transceiver module 1101 is configured to receive first information sent by a first communication device; or
receive second positioning assistance information sent by a network-side device. The third execution module 1102 is configured to perform positioning.

The first information includes at least one of the following:
information about transmission and reception point or base station;
panel information;
group delay information;
error information;
beam information;
error compensation information;
first location information; and
first signal measurement information;
second signal measurement information;
quality of reported location information being higher than a first threshold; and
an error of a reported location being less than the second threshold.

The second positioning assistance information includes at least one of the following:
panel information of a TRP or communication device;
group delay information of the TRP or communication device;
error information of the TRP or communication device;
beam information of the TRP or communication device;
error compensation information of the TRP or communication device;
first location information of the first communication device;
first signal measurement information of the first communication device; and
second signal measurement information of the first communication device.

Further, the first communication device has at least one of the following characteristics:
real location information of the communication device being already known;
location track of the communication device being already known;
first location information quality of the communication device being higher than the first threshold;
first location error of the communication device being less than the second threshold;
movement of the communication device is controlled or configured by a network side;
a first location of the communication device being controlled or configured by the network side;
a panel used for performing measurement on or sending the reference signal by the communication device being specified by the network-side device; and
group delay information used for performing measurement on or sending a reference signal by the communication device being specified by the network-side device.

Therefore, in the positioning method provided in this embodiment of this application, the first information sent by the first communication device or the second positioning assistance information sent by the network-side device is received, thereby improving positioning accuracy of the communication device.

Figure 12:
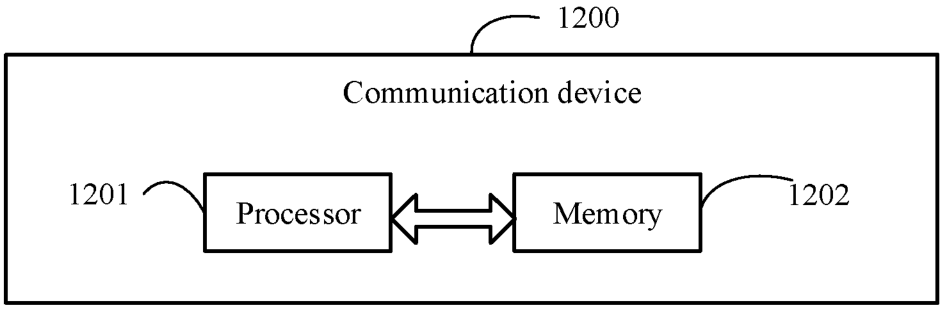
FIG. 12 is a schematic structural diagram of a communication device according to an embodiment of this application.

Optionally, as shown in FIG. 12, an embodiment of this application further provides a communication device 1200, including a processor 1201, a memory 1202, and a program or instructions stored in the memory 1202 and capable of running on the processor 1201. For example, when the communication device 1200 is a terminal and when the program or instructions are executed by the processor 1201, the processes of the foregoing embodiment of the positioning method are implemented, with the same technical effects achieved. When the communication device 1200 is a network-side device and when the program or instructions are executed by the processor 1201, the processes of the foregoing embodiment of the positioning method are implemented, with the same technical effects achieved. To avoid repetition, details are not described herein again.

Figure 13:
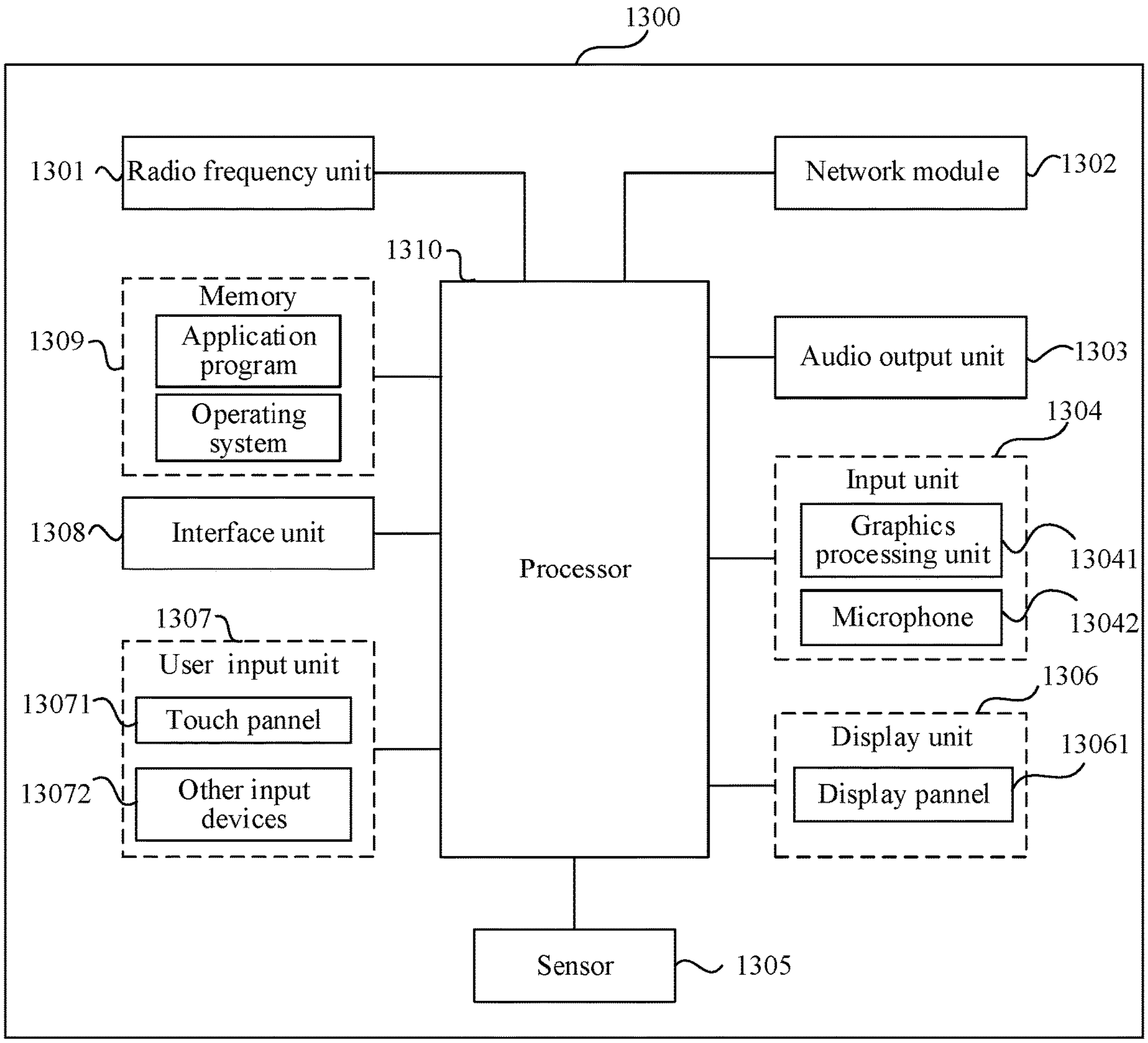
FIG. 13 is a schematic structural diagram of a first communication device for implementing the embodiments of this application.

Optionally, the first communication device may be a terminal, and FIG. 13 is a schematic diagram of a hardware structure of the first communication device for implementing the embodiments of this application.

The communication device 1300 includes but is not limited to components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

A person skilled in the art can understand that the communication device 1300 may further include a power supply (for example, a battery) supplying power to the components, and the power supply may be logically connected to the processor 1310 through a power management system. In this way, functions such as charge management, discharge management, and power consumption management are implemented by using the power management system. The structure of the communication device shown in FIG. 13 does not constitute any limitation on the communication device. The communication device may include more or fewer components than shown in the figure, or a combination of some components, or the components disposed differently. Details are not repeated herein.

It can be understood that in this embodiment of this application, the input unit 1304 may include a graphics processing unit (GPU) 13041 and a microphone 13042. The graphics processing unit 13041 processes image data of a still picture or video obtained by an image capture apparatus (such as a camera) in a video capture mode or an image capture mode. The display unit 1306 may include a display panel 13061, and the display panel 13061 may be configured in a form of a liquid crystal display, an organic light-emitting diode, and the like. The user input unit 1307 may include a touch panel 13071 and other input devices 13072. The touch panel 13071 is also referred to as a touchscreen. The touch panel 13071 may include two parts: a touch detection apparatus and a touch controller. The other input devices 13072 may include but are not limited to a physical keyboard, a function key (such as a volume control key or a power on/off key), a trackball, a mouse, a joystick, and the like. Details are not described herein.

In this embodiment of this application, the radio frequency unit 1301 receives downlink data from a network-side device, and then sends the downlink data to the processor 1310 for processing; and also sends uplink data to the network-side device. Generally, the radio frequency unit 1301 includes but is not limited to an antenna, at least one amplifier, a transceiver, a coupler, a low noise amplifier, a duplexer, and the like.

The memory 1309 may be configured to store software programs or instructions and various data. The memory 1309 may include a program or instruction storage area and a data storage area. The program or instruction storage area may store an operating system, an application program or instruction required by at least one function (for example, a sound playback function or an image playback function), and the like. In addition, the memory 1309 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another volatile solid-state storage device.

The processor 1310 may include one or more processing units. Optionally, an application processor and a modem processor may be integrated in the processor 1310. The application processor primarily processes an operating system, user interfaces, application programs or instructions, and the like. The modem processor primarily processes radio communication, for example, being a baseband processor. It can be understood that the modem processor may alternatively be not integrated in the processor 1310.

The processor 1310 is configured to perform measurement on and/or send the reference signal, and determine the first information based on the reference signal.

According to the embodiments of this application, positioning accuracy of the communication device can be improved.

Figure 14:
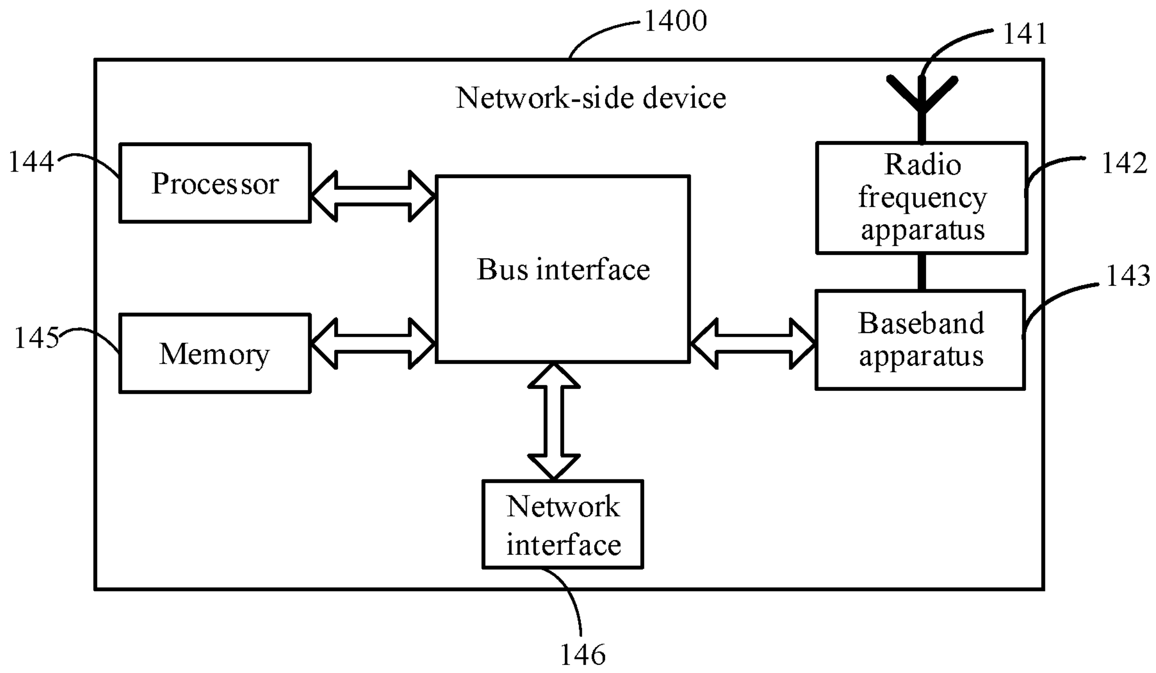
FIG. 14 is a schematic structural diagram of a network-side device for implementing the embodiments of this application.

Specifically, an embodiment of this application further provides a network-side device. As shown in FIG. 14, the network-side device 1400 includes an antenna 141, a radio frequency apparatus 142, and a baseband apparatus 143. The antenna 141 is connected to the radio frequency apparatus 142. In an uplink direction, the radio frequency apparatus 142 receives information by using the antenna 141, and sends the received information to the baseband apparatus 143 for processing. In a downlink direction, the baseband apparatus 143 processes to-be-sent information, and sends the information to the radio frequency apparatus 142; and the radio frequency apparatus 142 processes the received information and then sends the information out by using the antenna 141.

The frequency band processing apparatus may be located in the baseband apparatus 143. The method performed by the network-side device in the foregoing embodiments may be implemented in the baseband apparatus 143, and the baseband apparatus 143 includes a processor 144 and a memory 145.

The baseband apparatus 143 may include, for example, at least one baseband board, where a plurality of chips are disposed on the baseband board. As shown in FIG. 14, one of the chips, for example, the processor 144, is connected to the memory 145, to invoke a program in the memory 145 to perform the operation of the network device shown in the foregoing method embodiments.

The baseband apparatus 143 may further include a network interface 146, configured to exchange information with the radio frequency apparatus 142, where the interface is, for example, a common public radio interface (CPRI for short).

Specifically, the network-side device in this embodiment of this application further includes: instructions or a program stored in the memory 145 and capable of running on the processor 144. The processor 144 invokes the instructions or program in the memory 145 to perform the method performed by the modules shown in FIG. 6, with the same technical effects achieved. To avoid repetition, details are not repeated herein.

Figure 15:
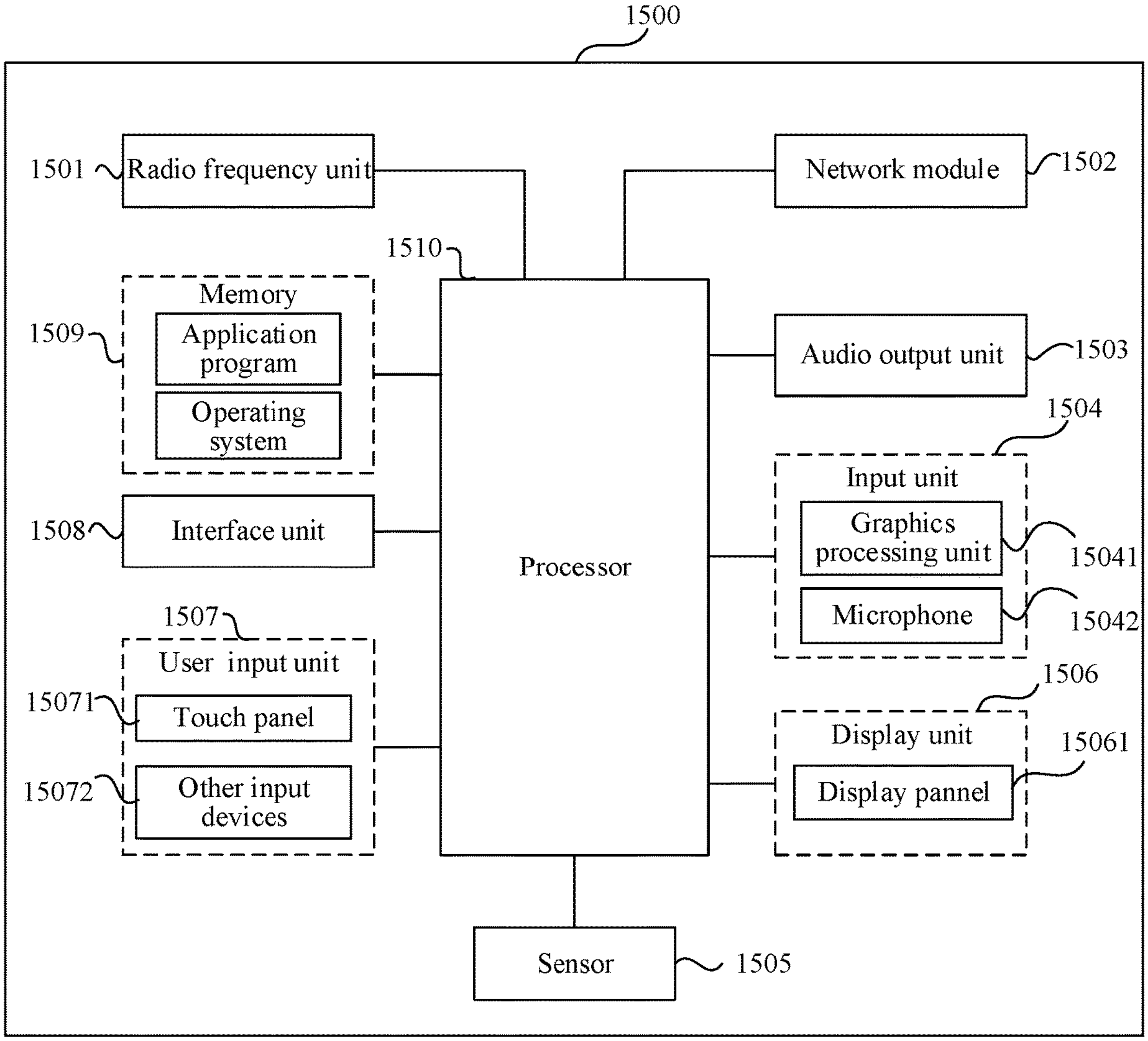
FIG. 15 is a schematic structural diagram of a second communication device for implementing the embodiments of this application.

Optionally, the second communication device may be a terminal, and FIG. 15 is a schematic diagram of a hardware structure of the second communication device for implementing the embodiments of this application.

The communication device 1500 includes but is not limited to components such as a radio frequency unit 1501, a network module 1502, an audio output unit 1503, an input unit 1504, a sensor 1505, a display unit 1506, a user input unit 1507, an interface unit 1508, a memory 1509, and a processor 1510.

A person skilled in the art can understand that the communication device 1500 may further include a power supply (for example, a battery) supplying power to the components, and the power supply may be logically connected to the processor 1510 through a power management system. In this way, functions such as charge management, discharge management, and power consumption management are implemented by using the power management system. The structure of the communication device shown in FIG. 15 does not constitute any limitation on the communication device. The communication device may include more or fewer components than shown in the figure, or a combination of some components, or the components disposed differently. Details are not repeated herein.

It can be understood that in this embodiment of this application, the input unit 1504 may include a graphics processing unit (GPU) 15041 and a microphone 15042. The graphics processing unit 15041 processes image data of a still picture or video obtained by an image capture apparatus (such as a camera) in a video capture mode or an image capture mode. The display unit 1506 may include a display panel 15061, and the display panel 15061 may be configured in a form of a liquid crystal display, an organic light-emitting diode, and the like. The user input unit 1507 may include a touch panel 15071 and other input devices 15072. The touch panel 15071 is also referred to as a touchscreen. The touch panel 15071 may include two parts: a touch detection apparatus and a touch controller. The other input devices 15072 may include but are not limited to a physical keyboard, a function key (such as a volume control key or a power on/off key), a trackball, a mouse, a joystick, and the like. Details are not described herein.

In this embodiment of this application, the radio frequency unit 1501 receives downlink data from a network-side device, and then sends the downlink data to the processor 1510 for processing; and also sends uplink data to the network-side device. Generally, the radio frequency unit 1501 includes but is not limited to an antenna, at least one amplifier, a transceiver, a coupler, a low noise amplifier, a duplexer, and the like.

The memory 1509 may be configured to store software programs or instructions and various data. The memory 1509 may include a program or instruction storage area and a data storage area. The program or instruction storage area may store an operating system, an application program or instruction required by at least one function (for example, a sound playback function or an image playback function), and the like. In addition, the memory 1509 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another volatile solid-state storage device.

The processor 1510 may include one or more processing units. Optionally, an application processor and a modem processor may be integrated in the processor 1510. The application processor primarily processes an operating system, user interfaces, application programs or instructions, and the like. The modem processor primarily processes radio communication, for example, being a baseband processor. It can be understood that the modem processor may alternatively be not integrated in the processor 1510.

The radio frequency unit 1501 receives first information sent by a first communication device, or receives second positioning assistance information sent by a network-side device.

According to the embodiments of this application, positioning accuracy of the communication device can be improved.

An embodiment of this application further provides a readable storage medium, where the readable storage medium stores a program or instructions. When the program or instructions are executed by a processor, the processes of the foregoing embodiment of the positioning method described above can be implemented, with the same technical effects achieved. To avoid repetition, details are not described herein again.

The processor is a processor in the communication device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface. The communication interface is coupled to the processor, and the processor is configured to run a program or instructions of a network-side device to implement the processes of the foregoing positioning method embodiments, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

The invention claimed is:

1. A positioning method, performed by a first communication device and comprising:
   - performing measurement on and/or sending a reference signal; and
   - determining first information based on the reference signal;
   - reporting the first information to a network-side device; wherein
   - the first communication device has the following characteristics:
   - real location information of the first communication device being already known;
   - wherein the first information comprises at least one of the following:
     - first location information;
     - first signal measurement information;
     - second signal measurement information;
   - wherein the first information is used to determine at least one of the following of second communication device:
     - first location information;
     - first signal measurement information;
   - wherein the first communication device is a reference communication device,
   - wherein the first signal measurement information comprises at least one of:
   - receive-transmit time difference measurement information;
   - time-of-arrival measurement information;
   - reference signal identification information;
   - reference signal received power information;
   - angle measurement information; and
   - transmission and reception point identification information;
   - wherein the second signal measurement information comprises at least two of:
   - reference signal received power measurement information;
   - reference signal time difference measurement information;
   - receive-transmit time difference measurement information;
   - time-of-arrival measurement information;
   - reference signal identification information;
   - time identification information;
   - angle measurement information; and
   - transmission and reception point identification information;

or
   - wherein the second signal measurement information comprises: time measurement information, angle measurement information, and energy measurement information.

2. The method according to claim 1, wherein the real location information is obtained according to a RAT-independent positioning technology or an angle-based positioning technology.

3. The method according to claim 1, wherein the first location information comprises at least one of the following:
   - absolute location information;
   - relative location information;
   - track information;
   - path information;
   - speed information;
   - acceleration information; and
   - direction information.

4. The method according to claim 1, wherein the first communication device comprises at least one of the following types:
   - terminal type;
   - terminal-type roadside unit or transmission and reception point;
   - base station type; and
   - base station-type roadside unit or transmission and reception point.

5. The method according to claim 4, wherein type information of the first communication device further comprises at least one of the following:
   - a location of the first communication device remaining unchanged;
   - a location of the first communication device remaining unchanged within a first time range;
   - a location track of the first communication device remaining unchanged;
   - a location track of the first communication device remaining unchanged within a second time range;
   - a target positioning method supported by the first communication device;
   - target location request information that the first communication device supports to receive; and
   - target location information that the first communication device supports to report.

6. The method according to claim 5, wherein the supported target positioning method or the method for obtaining the first location information comprises at least one of the following:
   - hybrid positioning method;
   - angle positioning method;
   - time positioning method; and
   - RAT-independent positioning method.

7. The method according to claim 5, wherein the target location request information being supported to receive comprises at least one of the following:
   - event-triggered location request information;
   - request information for requesting both location information and signal measurement information;
   - location request information with quality being higher than a third threshold;
   - error request information;
   - group delay request information;
   - error compensation request information; and
   - panel configuration request information.

8. The method according to claim 5, wherein the target location information being supported to report comprises at least one of the following:

panel information;
group delay information;
location information and signal measurement information that are simultaneously reported;
quality of reported location information being higher than the first threshold;
an error of a reported location being less than the second threshold;
error information;
error compensation information; and
panel configuration information.

9. The method according to claim 1, wherein before the performing measurement on and/or sending a reference signal, the method further comprises:
receiving location request information, wherein the location request information comprises at least one of the following:
type information request for the first communication device;
event trigger condition;
quality threshold or error threshold for location information;
error request information;
group delay request information;
error compensation request information;
panel information for performing measurement on and/or sending the reference signal;
group delay group information for performing measurement on and/or sending the reference signal;
information about a transmission and reception point specified for measurement; and
measurement information specified for reporting.

10. The method according to claim 1, wherein before the performing measurement on and/or sending a reference signal, the method further comprises:
receiving positioning assistance data, wherein the positioning assistance data comprises:
positioning assistance data used for the first communication device;
wherein the positioning assistance data used for the first communication device comprises a target information element corresponding to the first communication device or positioning assistance data obtained through parsing by the first communication device.

11. The method according to claim 1, wherein, after determining first information based on the reference signal, the method further comprises:
reporting the first information, wherein the first information comprises at least one of the following:
information about transmission and reception point or base station;
panel information;
group delay information;
error information;
beam information;
error compensation information;
first location information;
first signal measurement information;
second signal measurement information;
quality of reported location information being higher than the first threshold; and
an error of a reported location being less than the second threshold.

12. The method according to claim 11, wherein the error information comprises at least one of the following:
reference signal received power measurement error information;
reference signal time difference measurement error information;
receive-transmit time difference measurement error information;
time-of-arrival measurement error information;
reference signal received power information;
angle error information;
transmit beam error information; and
receive beam error information.

13. The method according to claim 11, wherein the group delay information comprises at least one of the following:
group delay identification information;
group delay group identification information;
group delay group value information;
group delay group error information;
group delay difference information;
reference group delay identification information; and
group delay value information.

14. The method according to claim 11, wherein before the performing measurement on and/or sending a reference signal, the method further comprises at least one of the following:
obtaining an association relationship between the group delay information and the reference signal;
obtaining an association relationship between the panel information and the reference signal; and
obtaining an association relationship between the beam information and the reference signal.

15. The method according to claim 1, wherein the first signal measurement information further comprises at least one of the following:
reference signal received power measurement information;
reference signal time difference measurement error information.

16. A communication device, comprising a processor, a memory, and a program or instructions stored in the memory and capable of running on the processor, wherein when the program or instructions are executed by the processor,
the steps of the positioning method according to claim 1 are implemented.

17. A positioning method, performed by a second communication device and comprising:
receiving second positioning assistance data reported by a network-side device;
wherein the second positioning assistance data comprises at least one of the following:
first location information of the first communication device;
first signal measurement information of the first communication device; and
second signal measurement information of the first communication device;
wherein the first communication device has the following characteristics:
real location information of the first communication device being already known;
wherein the first communication device is a reference communication device,
wherein the method further comprises:
determining, by the second communication device based on the second positioning assistance data, at least one of the following of second communication device:
first location information;
first signal measurement information;
wherein the first signal measurement information comprises at least one of:

receive-transmit time difference measurement information;

time-of-arrival measurement information;

reference signal identification information;

reference signal received power information;

angle measurement information; and transmission and reception point identification information;

wherein the second signal measurement information comprises at least two of:

reference signal received power measurement information;

reference signal time difference measurement information;

receive-transmit time difference measurement information;

time-of-arrival measurement information;

reference signal identification information;

time identification information;

angle measurement information; and transmission and reception point identification information;

or wherein the second signal measurement information comprises: time measurement information, angle measurement information, and energy measurement information.

18. A communication device, comprising a processor, a memory, and a program or instructions stored in the memory and capable of running on the processor, wherein when the program or instructions are executed by the processor, the steps of the positioning method according to claim 17 are implemented.

19. A positioning method, performed by a network-side device and comprising:

receiving first information reported by a first communication device; wherein the first communication device has the following characteristics: real location information of the first communication device being already known;

wherein the method further comprises: reporting second positioning assistance data to a second communication device;

wherein the first information and the second positioning assistance data comprises at least one of:

first location information of the first communication device;

first signal measurement information of the first communication device;

second signal measurement information of the first communication device wherein the first information and the second positioning assistance data is used to determine at least one of the following of second communication device:

first location information;

first signal measurement information;

wherein the first communication device is a reference communication device, wherein the first signal measurement information comprises at least one of:

receive-transmit time difference measurement information;

time-of-arrival measurement information;

reference signal identification information;

reference signal received power information;

angle measurement information; and transmission and reception point identification information;

wherein the second signal measurement information comprises at least two of:

reference signal received power measurement information;

reference signal time difference measurement information;

receive-transmit time difference measurement information;

time-of-arrival measurement information;

reference signal identification information;

time identification information;

angle measurement information; and transmission and reception point identification information;

or wherein the second signal measurement information comprises: time measurement information, angle measurement information, and energy measurement information.

20. A communication device, comprising a processor, a memory, and a program or instructions stored in the memory and capable of running on the processor, wherein when the program or instructions are executed by the processor, the steps of the positioning method according to claim 19 are implemented.

* * * * *